(12) United States Patent
Merettig

(10) Patent No.: US 7,638,753 B2
(45) Date of Patent: Dec. 29, 2009

(54) METHOD OF OPERATING AN OPTOELECTRONIC SENSOR

(75) Inventor: Gerhard Merettig, Sexau (DE)

(73) Assignee: Sick AG, Waldkirch (DE)

( * ) Notice: Subject to any disclaimer, the term of this patent is extended or adjusted under 35 U.S.C. 154(b) by 111 days.

(21) Appl. No.: 11/887,870

(22) PCT Filed: Apr. 10, 2006

(86) PCT No.: PCT/EP2006/003283

§ 371 (c)(1), (2), (4) Date: Oct. 31, 2007

(87) PCT Pub. No.: WO2006/108601

PCT Pub. Date: Oct. 19, 2006

(65) Prior Publication Data

US 2009/0026356 A1    Jan. 29, 2009

(30) Foreign Application Priority Data

Apr. 11, 2005  (DE)  ........................ 10 2005 016 556

(51) Int. Cl.
*G06M 7/00* (2006.01)
*G01N 21/86* (2006.01)
*G01C 3/08* (2006.01)

(52) U.S. Cl. .................. 250/221; 250/559.38; 356/4.01

(58) Field of Classification Search .................. 250/221, 250/214 A, 214 R, 214 LA, 214 LS, 559.38, 250/222.1, 216; 356/4.01, 5.01–5.08; 348/234–235, 348/353; 358/3.06, 3.13, 3.26; 341/51, 59; 330/59, 308

See application file for complete search history.

(56) References Cited

U.S. PATENT DOCUMENTS 5,250,801 A * 10/1993 Grozinger et al. ....... 250/223 B
5,416,316 A    5/1995 Kappeler

FOREIGN PATENT DOCUMENTS

DE    4141468    6/1993

(Continued)

OTHER PUBLICATIONS

German Search Report dated Apr. 4, 2006 relating to German Patent Application No. 10 2005 016 556.7; 4 pages.

(Continued)

*Primary Examiner*—Georgia Y Epps
*Assistant Examiner*—Don Williams
(74) *Attorney, Agent, or Firm*—Harness, Dickey & Pierce, P.L.C.

(57) ABSTRACT

The invention relates to a method for operating an optoelectronic sensor, particularly a light barrier, during which a light emitter emits light signals having a time interval toward a monitoring area, at least some of the light signals being comprised of a number of successive individual pulses. A light receiver receives the emitted light signals. An evaluating unit processes received signals generated from the received light signals and outputs an object determination signal according to the evaluation result. According to the inventive method, a number of light signals are emitted in a regular sequence, the courses of the respective received signals being evaluated in a different manner. The invention also relates to an optoelectronic sensor that is suited for carrying out the aforementioned method.

27 Claims, 2 Drawing Sheets

FOREIGN PATENT DOCUMENTS

Figure 1:
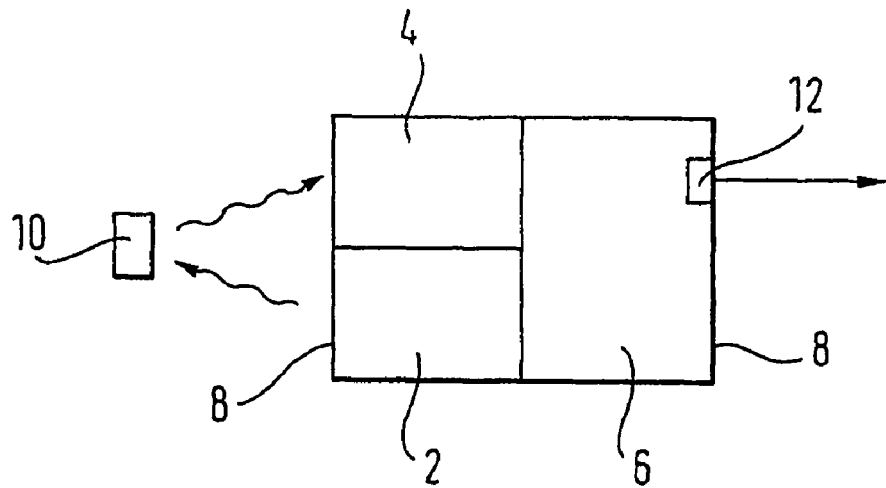

| | | |
|---|---|---|
| DE | 4323910 | 1/1995 |
| DE | 4312186 | 4/1995 |
| DE | 19924351 | 12/1999 |
| DE | 19847841 | 5/2000 |
| DE | 10148069 | 1/2003 |
| DE | 10231178 | 2/2004 |
| DE | 10346813 | 5/2005 |
| EP | 1040366 | 10/2000 |

OTHER PUBLICATIONS

International Search Report for International Application No. PCT/EP2006/003283, mailed Jul. 14, 2006; 2 pages.

Translation of German Search Report dated Apr. 4, 2006 relating to German Patent Application No. 10 2005 016 556.7; 5 pages.

* cited by examiner

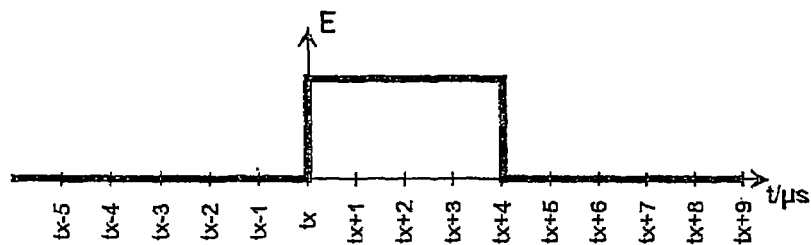
Fig. 3a
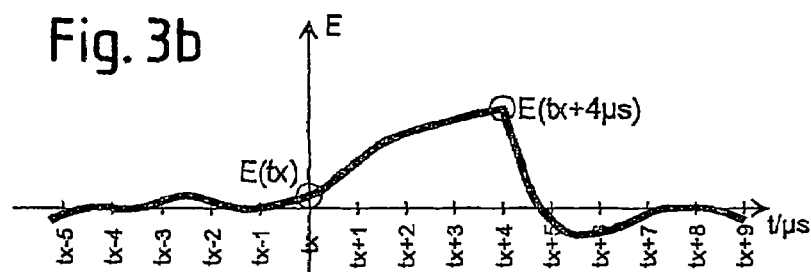
Fig. 3b
Fig. 4

METHOD OF OPERATING AN OPTOELECTRONIC SENSOR

CROSS-REFERENCE TO RELATED APPLICATIONS

This Application is a 371 U.S. National Stage of International Application No. PCT/EP2006/003283, filed Apr. 10, 2006. This application claims the benefit of German Application No. 10 2005 016 556.7, filed Apr. 11, 2005. The disclosures of the above referenced applications are incorporated herein by reference.

The invention relates to a method of operating an optoelectronic sensor, in particular a light barrier, wherein
- a light transmitter transmits light signals having a time interval in the direction of a monitored zone, with at least some of the light signals each comprising a plurality of sequential individual pulses;
- a light receiver receives the transmitted light signals; and
- an evaluation unit processes received signals generated from the received light signals and outputs an object detection signal in dependence on the evaluated result.

The invention furthermore also relates to an optoelectronic sensor in which a method of the named kind is used.

Light transmitters and light receivers in the mentioned optoelectronic sensors can be accommodated inside a common housing. It can be detected in this case whether light transmitted by the light transmitter is reflected or remitted to the light receiver by an object located in the monitored zone so that an object detection signal can be output on the reception of such a reflected or remitted light signal. In an alternative embodiment of an optoelectronic sensor, the light transmitter and light receiver can also be accommodated in separate housings, with the light receiver receiving the light transmitted by the light transmitter in the case of an object-free monitored zone. When an object is present in the monitored zone, the light transmitted by the light transmitter cannot reach the light receiver so that an object detection signal is output in these cases. It is therefore necessary in both alternatives to recognize whether the light receiver receives a signal transmitted by the light transmitter or not.

The fact is problematic with optoelectronic sensors of the named kind that not only the wanted signal transmitted by the light transmitter reaches the light receiver, but also interference signals which can falsify the received signal, just like noise signals which are generated by the components used in the optoelectronic sensor. Received signals falsified in this manner can then result in an erroneous emission of an object detection signal or in the erroneous omission of the emission of an object detection signal, which is in particular not acceptable with security-relevant applications.

It is known from the German laid-open specification DE 41 41 468 A1 of the applicant for the suppression or filtering of interference signals to transmit light signals in time sequence which each comprise a plurality of sequential individual pulses, with the received light signals running through a filter arrangement in the evaluation unit of the light receiver, said filter arrangement substantially only transmitting spectral portions of the pulse repetition frequency. The frequency of the received signal is considerably increased with respect to the use of light signals only comprising one single, correspondingly longer individual pulse by the use of light signals with a plurality of sequential individual pulses so that low interference frequencies can be filtered in an improved manner by the mentioned filter arrangement. The fact is, however, disadvantageous in the arrangement described in DE 41 41 468 that the efficiency of the filtering of interference signals is not yet sufficient for specific applications.

An underlying object of the invention consequently comprises providing a method of the initially named kind as well as an optoelectronic sensor for the carrying out of such a method which can efficiently suppress interference signals and can also in particular be manufactured with a low economic effort.

This object is satisfied in accordance with the invention by the features of claim 1 and in particular in that a plurality of light signals, in particular light signals different from one another, are transmitted in a regular order, with the characteristics of the received signals respectively associated with the in particular different light signals being evaluated in a manner differing from one another. If different light signals are used, they can be selected such that the received signals respectively associated with them are disposed in different frequency ranges so that different interference frequencies can be suppressed with each type of light signal and the evaluation method respectively associated with it.

In accordance with the invention, the characteristics of the received signals are evaluated, which means that not only the number of the received individual pulses are counted and evaluated, but that rather the total characteristic of the received signals, that is e.g. also sections of the received signal which are not associated with any single received pulse or e.g. the duration, level or shape of the received individual pulses, can go into the evaluation. It thus becomes possible in accordance with the invention to suppress interference signals efficiently, with it, however, not being necessary in accordance with the invention first to detect the existence or the type of such interference signals for this purpose.

The evaluation of the received signals can take place either in analog or in digital manner.

Light signals which are the same as one another, but also two or more light signals which differ from one another can generally be used which satisfy the aforesaid condition with respect to the frequency ranges of the associated received signals.

Specifically, for example, two different light signals can be alternately transmitted, with the first light signal comprising a plurality of sequential individual pulses in which the duration of an individual pulse is at least substantially equal to the duration of a pause between two sequential individual pulses and the second light signal comprising a single individual pulse whose duration corresponds to at least a multiple of the duration of the individual pulse of the first light signal. In this connection, the time interval in which both light signals are transmitted can correspond to a multiple of the duration of the individual pulse of the second light signal.

Within the framework of the evaluation, a check can be made for each received light signal whether a first or a second condition is satisfied. How these conditions can specifically be configured will be explained in even more detail in the following. An object detection signal can, for example, be output when the first and/or the second condition is satisfied for sequential light signals.

When the object detection signal is output, if either the first or the second condition is satisfied, a particularly good interference signal suppression can be achieved. The emission of an erroneous object detection signal can be avoided even better when an object detection signal is only output when the first condition and simultaneously also the second condition are satisfied. Additional security can be achieved on the emission of an object detection signal in that such a signal is only output when the first condition and the second condition are satisfied for four or more sequential light signals.

A frequency band of the received signal can come to lie in a particularly advantageous range when the duration of an individual pulse of a light signal is at least substantially equal to the duration of the pause between two sequential individual pulses. With a suitable individual pulse length, which can amount e.g. to 1 µs, the frequency band of the received signal with respect to the corresponding light signal is disposed in a comparatively high range, for example at approximately 500 kHz so that interference signals at lower frequencies can be suppressed particularly efficiently.

It is generally preferred if the individual pulses have a rectangular shape. Generally, however, different time relationships are also conceivable.

Only discrete values of the received signal are preferably used for the evaluation, with the time interval between the sequential discrete values corresponding to the duration of an individual pulse and/or the duration of a pause between two individual pulses of a light signal. The effort to be made in the framework of the evaluation unit is therefore minimized in that only a very low number of discrete values of the received signal is processed, which is naturally associated with a much lower effort than the processing of a comparatively high number of values. At the same time, it is ensured by the adroit selection in accordance with the invention of the values to be processed that they permit a maximum statement on the time characteristic of the received signal or on whether a light signal was received or not. The manner in which the specific processing of the received signals to be evaluated in accordance with the invention can run will be explained in more detail below.

The discrete values of the received signal are preferably detected at least at all those times which correspond to the start and to the end of received individual pulses, in particular to all received individual pulses. A received signal detection of this type delivers maximum possible information on the time characteristic of the received signal despite the low number of the detected values. It is advantageous in this connection for the detection points in time to be determined while taking account of the time of flight of light between the light transmitter and the light receiver from the points in time of the individual pulse transmissions. With a known time of flight of light between the light transmitter and the light receiver, it can be calculated in a simple manner in this case when a transmitted individual pulse can be expected from the light receiver so that then, with a known individual pulse length, the times of the start and of the end of an individual pulse expected at the receiver side can be calculated in a simple manner.

The received signal is preferably filtered before the detection of the discrete values. In this context, a bandpass filter, a lowpass filter or an integrator can e.g. be used.

A particularly simple and efficient evaluation of the discrete values of the received signal determined in accordance with the invention results when a cumulative value is formed for every received light signal from n values of the discrete received signal, in particular from all of the discrete values of the received signal associated with the respective light signal, comprising a plurality of individual pulses, with the discrete values associated in each case with the start and the end of the received individual pulses of the respective light signal being allocated signs different from one another. All values occurring in each case at the start of the individual pulses can thus, for example, be allocated a negative sign and all values occurring in each case at the end of the individual pulses can be allocated a positive sign so that a relatively high cumulative value is adopted when the reception of a light signal is present, whereas a low value is obtained when a light signal is only expected, but is not actually received.

It is consequently sensible always to output an object detection signal when the cumulative value of a received signal generated by a first light signal and/or the cumulative value of a received signal generated by a further light signal exceeds a respectively predetermined threshold value. The first and the further light signals differ from one another in this connection.

To increase the reliability with respect to the emission of a correct object detection signal even further, such a signal can also only be output on the exceeding of the respective threshold values by the cumulative values of sequential light signal sequences comprising in each case a plurality of different light signals.

On the alternate use of two different light signals of the type already explained above, a first cumulative value such as was already explained above can be formed within the framework of the evaluation for each received first light signal comprising a plurality of individual pulses. A second cumulative value can then be generated for each received second light signal which—as mentioned—comprises only one single individual pulse, with the discrete values of the received signal associated with the start and the end of the received individual pulse of the second light signal being allocated signs different from one another.

An object detection signal can, for example, be output when the first cumulative value and/or the second cumulative value exceed the threshold values associated with them in each case with sequential light signals. When the object detection signal is detected when either the first cumulative value or the second cumulative value exceeds the respectively associated threshold value, a particularly good interference signal suppression can be achieved. The emission of an erroneous object detection signal can, however, better be avoided if an object detection signal is only output when the first and the second cumulative values exceed the threshold values respectively associated with them. Additional reliability in the emission of an object detection signal can be achieved in that such a signal is only output when the first and the second cumulative values exceed the threshold values respectively associated with them in four or more sequential light signals.

In addition to the formation of a cumulative value explained above, in a preferred embodiment of the method in accordance with the invention, a difference value related to the respective light signal can also still be gained in accordance with the following rule from the discrete values of received signals gained from light signals which comprise a plurality of single pulses:

A first intermediate cumulative value is formed for the received light signal from n discrete values of the received signal associated with the start and with the end of the received individual pulses of the respective light signal, with these values being allocated the same signs among one another. Furthermore, a second intermediate cumulative value is formed from further n discrete values of the received signal likewise allocated the same values among one another, with these values being associated with points in time which, on the one hand, are before the reception of the first light pulse of the respective light signal and, on the other hand, have the same time intervals among one another as the values used for the formation of the first intermediate cumulative value. Subsequently, the mentioned difference value is then calculated from the first and the second intermediate cumulative values.

An object detection signal can be output, for example, when the difference value exceeds a predetermined threshold value.

It is, however, preferred for an object detection signal only to be able to be determined when both the mentioned cumulative value and the difference value last explained exceed the threshold values respectively associated with them. In this case, the respective received signals are therefore evaluated in two different manners.

In addition to the conditions named above, it can also be demanded in accordance with the invention that even further conditions which are related to light signals of a different kind are satisfied for the emission of an object detection signal.

All the methods described above with respect to discrete values of the received signal can also be carried out in an analog manner.

In addition to the methods described above, the invention also relates to an optoelectronic sensor, in particular to a light barrier, comprising

- a light transmitter for the transmission of light signals having a time interval in the direction of a monitored zone, with at least some of the light signals comprising a plurality of sequential individual pulses in each case;
- a light receiver for the reception of the transmitted light signals; and
- an evaluation unit for the processing of a received signal generated from the received light signals and for the emission of an object detection signal in dependence on the evaluation result.

With such an optoelectronic sensor in accordance with the invention, the light transmitter is configured for the transmission of light signals different from one another in a regular order, with the evaluation unit being suitable for the carrying out of different evaluation methods which are used for the different light signals.

The evaluation unit can be made in accordance with the invention such that it is suitable for the carrying out of all method variants in accordance with the invention described above.

Further preferred embodiments of the invention are explained in the dependent claims.

Figure 2A:
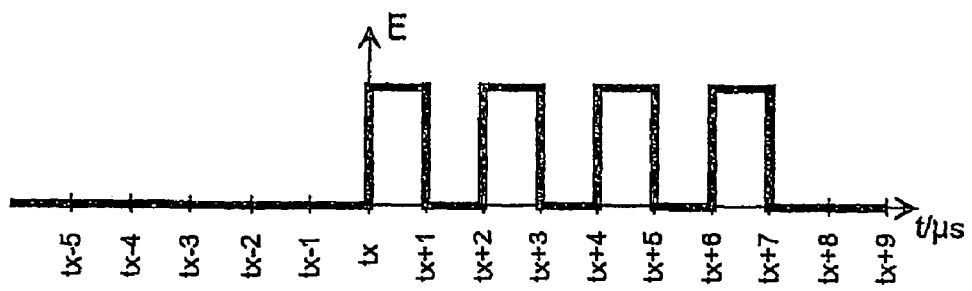
Figure 2B:
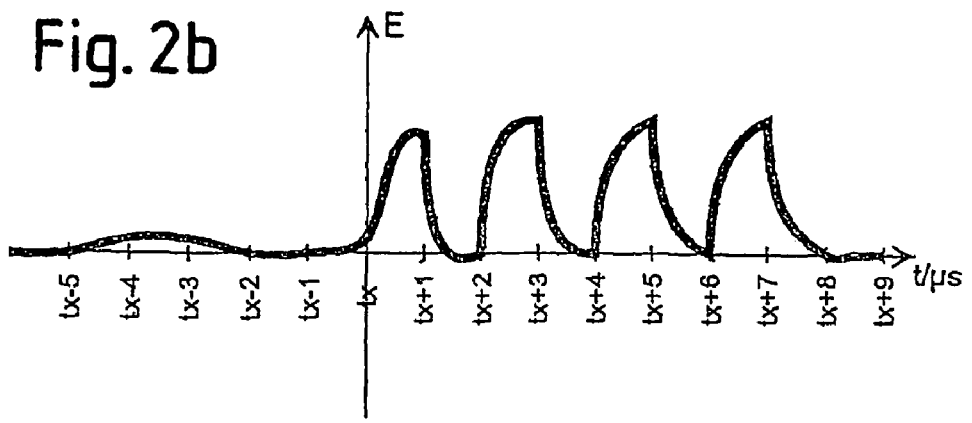

The invention will be described in more detail in the following with reference to embodiments and to the drawings; there are shown in these:

FIG. 1 a block diagram of an optoelectronic sensor in accordance with the invention;

FIG. 2a the time characteristic of a possible embodiment of a light signal in accordance with the invention;

FIG. 2b the time characteristic of a received signal generated by a light signal in accordance with FIG. 2a;

FIG. 3a the time characteristic of a light signal comprising only one single pulse;

FIG. 3b the time characteristic of a received signal generated by a light signal in accordance with FIG. 3a; and FIG. 4 the time characteristic of an alternative light signal which can be used in accordance with the invention.

FIG. 1 shows an optoelectronic sensor made as a light barrier in which a light transmitter 2, a light receiver 4 as well as an evaluation unit 6 are accommodated in a common housing 8. The light sensor 2 is suitable for the transmission of light rays into a monitored zone in which an object 10 to be detected can be located. Such an object 10 which has reflecting or remitting properties has the effect that the light transmitted by the light transmitter 2 is redirected to the light receiver 4 so that it can be received by it and can be passed on to the evaluation unit 6 as an electric signal. The evaluation unit 6 now determines in a manner in accordance with the invention whether a light signal was received or not. On a positive result, an object detection signal (arrow) is output by the optoelectronic sensor via the output 12 of the evaluation unit 6.

FIG. 2a shows a light signal which can be used in accordance with the invention and which can be output by a light transmitter 2 in accordance with FIG. 1. This light signal comprises a total of four sequential individual pulses which have an equal time duration and an equal amplitude among one another. The pauses between the individual pulses correspond to the duration of the individual pulses in this connection. In accordance with FIG. 2a, the four individual pulses are transmitted at the times tx, tx+2 µs, tx+4 µs and tx+6 µs The ends of these four individual pulses accordingly lie at the times tx+1 µs, tx+3 µs, tx+5 µs and tx+7 µs The absolute duration of an individual pulse and also the absolute duration of a pause between two individual pulses thus amount to 1 µs.

FIG. 2b shows—while neglecting the time of flight of light between the light transmitter 2 and the light receiver 4 for reasons of clarity—the time characteristic of a received signal generated by the light signal in accordance with FIG. 2a, with this received signal already having run through a bandpass present in the light receiver 4 or in the evaluation unit 6 and moreover having noise portions. It can easily be seen from FIG. 2b that the received signal has an amplitude value of approximately zero at those times which correspond to the start of the individual pulses in accordance with FIG. 2a, but in each case has a maximum at the times at which the individual pulses in accordance with FIG. 2a end.

In accordance with the invention, only discrete values of the received signal whose time interval among one another mounts to 1 µs in each case are used for the evaluation of the received signals in accordance with FIG. 2b. Specifically, at least those values are taken into account which correspond to the times at which the individual pulses in accordance with FIG. 2a start and end.

The said discrete values of the received signal in accordance with FIG. 2b can thus be calculated using the following formula to form a cumulative value S in accordance with the following formula:

$$S=-E(tx)+E(tx+1)-E(tx+2)+E(tx+3)-E(tx+4)+E(tx+5)-E(tx+6)+E(tx+7)-E(tx+8)$$

If the cumulative value S exceeds a predetermined threshold value, it is clear that a light signal in accordance with FIG. 2a was received, whereupon an object detection signal can be output via the output 12 in accordance with FIG. 1.

The relevant frequency portions of the received signal in accordance with FIG. 2b lie approximately at 500 kHz so that the method in accordance with the invention, which is based on the calculation of the previously explained cumulative value S, is suitable to suppress interference frequencies or noise frequencies comparatively well, for example, at least up to 100 kHz.

In a preferred embodiment of the invention, within the framework of the cumulative evaluation described, the following formula can also be used instead of the previously explained formula for the calculation of the cumulative value S:

$$S=-F_0*E(tx)+F_1*E(tx+1)-F_2*E(tx+2)+F_3*E(tx+3)-F_4*E(tx+4)+F_5*E(tx+5)-F_6*E(tx+6)+F_7*E(tx+7)-F_8*E(tx+8)$$

where $F_n$ represents a factor which can, for example, adopt values between 0 and 2. It is specifically possible, for example, to work with the following factors:

$$S=-0.4*E(tx)+0.8*E(tx+1)-0.9*E(tx+2)+1*E(tx+3)-1*E(tx+4)+1*E(tx+5)-0.9*E(tx+6)+0.8*E(tx+7)-0.4*E(tx+8)$$

In comparison with the use of factors $F_o$ to $F_s$ which are the same among one another, a suppression of frequencies less than 400 kHz results which is improved by approximately 30% by the above factors.

The filter characteristic of the described evaluation method can be matched even better to the respective demands by this alternative calculation of the cumulative value S while including the factors $F_n$. It is thus e.g. possible to optimize the evaluation by the selection of corresponding factors $F_n$ such that frequencies outside a narrow transmission range are suppressed even better.

With a further improved embodiment of the invention, not only the discrete values of the received signal going into the above formula are taken into account. It is rather the case that a further seven discrete values of the received signal are taken into account which are before the reception in time of the first individual pulse in accordance with FIG. 2a, that is before the time tx. These discrete values also have a time interval of 1 μs among one another. A difference value D according to the following formula can be calculated from the seven discrete values recorded after the time tx as well from the seven discrete values recorded before the time tx:

$$D = -[E(tx-1)+E(tx-2)+E(tx-3)+E(tx-4)+E(tx-5)+E(tx-6)+E(tx-7)]+[E(tx+1)+E(tx+2)+E(tx+3)+E(tx+4)+E(tx+5)+E(tx+6)+E(tx+7)]$$

One and the same received signal in accordance with FIG. 2b is thus evaluated sequentially in time or simultaneously in two different manners so that the cumulative value S is obtained, on the one hand, and the difference value D, on the other hand. An object detection signal is output, for example, when both the cumulative value S and the difference value D exceed threshold values respectively associated with them.

The last-named method has the advantage that two separate evaluation results are calculated from one single received signal, said evaluation results being insensitive to noise frequencies or interference frequencies which differ from one another.

Alternatively, the difference value can also be calculated using the following formula:

$$D = -[F_{-1}*E(tx-1)+F_{-2}*E(tx-2)+F_{-3}*E(tx-3)+F_{-4}*E(tx-4)+F_{-5}*E(tx-5)+F_{-6}*E(tx-6)+F_{-7}*E(tx-7)]+[F_{+1}*E(tx+1)+F_{+2}*E(tx+2)+F_{+3}*E(tx+3)+F_{+4}*E(tx+4)+F_{+5}*E(tx+5)+F_{+6}*E(tx+6)+F_{+7}*E(tx+7)]$$

where $F_n$ represents a factor which can, for example, adopt values between 0 and 2. Specifically, the factors $F_{-1}$, $F_{-7}$, $F_{+1}$ and $F_{+7}$ can, for example, each adopt the value 0.77 and all the other factors can adopt the value 1.

In comparison with the use of factors $F_n$ which are the same among one another, a suppression of frequencies in the range of 500 kHz results which is improved by approximately 40% by the above factors.

The evaluation can be optimized by this alternative calculation of the difference value D by the selection of corresponding factors $F_n$ such that a frequency band block can be set up which suppresses the frequency range of the transmission range of the cumulative evaluation explained above even better while forming the cumulative value S.

Interference signals which in particular occur at a discrete frequency can be suppressed very efficiently either by the cumulative value formation or by the difference value formation in the calculation of the cumulative value S and of the difference value D, in each case while using the factors $F_n$, so that erroneous evaluations can be effectively avoided, provided that an object detection signal is output when either the condition relating to the cumulative signal or the condition relating to the difference signal is satisfied.

FIG. 3a shows a light signal which only comprises a single pulse which has a duration of 4 μs. A received signal caused by such a light signal is shown in FIG. 3b, with the signal shown there—in accordance with FIG. 2b—having passed through a bandpass present in the light receiver 4 or in the evaluation unit 6 and furthermore being loaded with interference signals. FIG. 3b shows that the received signal has a very low amplitude at the time tx which corresponds to the time of the transmission of the pulse in accordance with FIG. 3a. The received signal in accordance with FIG. 3b has a maximum amplitude at the time tx+4 μs corresponding to the time of the end of the pulse in accordance with FIG. 3a.

In accordance with a variant in accordance with the invention, a light signal in accordance with FIG. 4 can be used which is composed of the light signals in accordance with FIGS. 2a and 3a, with the signal shapes being transmitted alternately in accordance with FIGS. 2a and 3a. The pauses between the individual light signals are much longer than the duration of the light signals themselves.

In the evaluation of a light signal in accordance with FIG. 4, those ranges of the received signal which were generated by light signals in accordance with FIG. 2a can be evaluated in one of the manners such as were already explained in connection with FIG. 2b. Those ranges of the received signal generated by a light signal in accordance with FIG. 4 which go back to a light signal shape in accordance with FIG. 3a can be evaluated in that the discrete value of the received signal which corresponds to the start of the pulse in accordance with FIG. 3a is subtracted from that discrete value of the received signal which corresponds to the end of the pulse in accordance with FIG. 3a. If the difference formed in this manner exceeds a predetermined threshold value, an object detection signal can be output.

It is preferred if an object detection signal is only output when the evaluations of received signal ranges going back to the two different signal shapes in accordance with FIG. 2a and FIG. 3a both result in the recognition separately from one another that a light signal was received.

The invention claimed is:

1. A method of operating an optoelectronic sensor, comprising:
a light transmitter transmitting light signals having a first time interval in a direction of a monitored zone, with at least some of the light signals each comprising a plurality of sequential individual pulses;
a light receiver receiving the transmitted light signals; and
an evaluation unit processing received signals generated from the received light signals and outputting an object detection signal in dependence on results of the processing performed by the evaluation unit,
wherein a plurality of the light signals are transmitted in a regular order,
wherein characteristics of respective ones of the received signals are evaluated differently,
wherein a respective cumulative value is formed for each of the received light signals from n values of the received signals associated with respective ones of the light signals after each of the n values are multiplied by a factor, where n is greater than zero, and
wherein each of the n values are associated with a respective start and a respective end of received members of the plurality of sequential individual pulses of the respective ones of the light signals and are each allocated different signs.

2. The method according to claim 1, wherein the plurality of light signals that are transmitted in a regular order are different from one another.

3. The method according to claim 2, wherein two different ones of the light signals are transmitted alternately.

4. The method according to claim 3, wherein a first of the two different ones of the light signals comprises the plurality of sequential individual pulses in which a first duration of a first individual pulse is at least substantially equal to a second duration of a pause between two of the plurality of sequential individual pulses and a second of the two different ones of the light signal comprises a single second individual pulse having a third duration that corresponds to a multiple of the first duration of the first individual pulse of the first of the two different ones of the light signals.

5. The method according to claim 4, wherein a second time interval in which both of the first and the second of the two different ones of the light signals are transmitted corresponds to at least a multiple of the third duration of the individual pulse of the second of the two different ones of the light signals.

6. The method according to claim 4,
wherein a first respective cumulative value is formed for each received first of the two different ones of the light signals from n discrete values that correspond to the n values,
wherein all the n discrete values are associated with a respective one of the light signals,
wherein the n discrete values are each associated with a first start and a first end of the received members of the plurality of sequential individual pulses of the respective first of the two different ones of the light signals,
wherein the n discrete values are allocated first signs different from one another,
wherein a second respective cumulative value is formed for the second of the two different ones of the light signals,
wherein the n discrete values are allocated second signs different from one another and are associated with a second start and with a second end of the plurality of sequential individual pulses of the second of the two different ones of the light signals.

7. The method according to claim 6, wherein the n discrete values of the received second of the two different ones of the light signals are each multiplied by a different one of a plurality of factors before forming the second respective cumulative value.

8. The method according to claim 6, wherein an object detection signal is output when at least one of the first respective cumulative value and the second respective cumulative value exceeds a respective threshold values for sequential ones of the light signals.

9. The method according to claim 8, wherein the object detection signal is only output when at least one of the first respective cumulative value and the second respective cumulative value exceeds one of the respective threshold values for four or more of the sequential ones of the light signals.

10. The method according to claim 1, wherein a first duration of a first of the plurality of sequential individual pulses of one of the light signals is at least substantially equal to a second duration of a pause between two of the plurality of sequential individual pulses of the one of the light signals.

11. The method according to claim 1, wherein each of the plurality of sequential individual pulses has a rectangular shape.

12. The method according to claim 1, wherein only discrete values of the received signals are used for evaluation by the evaluation unit, and wherein a time interval between sequential values corresponds to at least one of a first duration of one of the plurality of sequential individual pulses and a second duration of a pause between two of the plurality of sequential individual pulses of one of the plurality of the light signals.

13. The method according to claim 12, wherein the discrete values of the received signals are detected, at least at those times which correspond to the start and to the end of the received members of the plurality of sequential individual pulses.

14. The method according to claim 13, wherein detection times are determined while taking account of a time of flight of light between the light transmitter and the light receiver from times of transmissions of each of the plurality of sequential individual pulses.

15. The method according to claim 13, wherein the received ones of the plurality of sequential individual pulses include all of the plurality of sequential individual pulses.

16. The method according to claim 12,
wherein the n values correspond to n discrete values,
wherein all the n discrete values of the received signals are associated with a respective one of the light signals, and
wherein the n discrete values are each associated with the start and the end of the received members of the plurality of individual pulses, and
wherein the n discrete values are allocated signs different from one another.

17. The method according to claim 12, wherein the discrete values of the received signal are multiplied by the factor in each case before forming the respective cumulative value, wherein the factors in each case are different from one another.

18. The method according to claim 1, wherein an object detection signal is output based on at least one of exceeding of a first threshold value by a first respective cumulative value of a first of the received signals generated from a first of the light signals and exceeding of a second threshold value by a second respective cumulative value of a second of the received signals generated from a second of the light signals.

19. The method according to claim 18, wherein the object detection signal is only output on the exceeding of one of the first and second threshold values by at least one of the first respective cumulative values and the second respective cumulative value of several members of the received light signals that are sequential and different.

20. The method according to claim 1, wherein the optoelectronic sensor corresponds to a light barrier.

21. An optoelectronic sensor comprising:
a light transmitter for transmission of light signals having a time interval in a direction of a monitored zone, wherein at least some of the light signals each comprising a plurality of sequential individual pulses;
a light receiver for reception of the transmitted light signals; and
an evaluation unit for processing of a received signal generated from the received light signals and for outputting an object detection signal in dependence on results of evaluation of the received signal,
wherein the light transmitter is configured for transmission of a plurality of different ones of the light signals in a regular order,
wherein the evaluation unit is suitable for carrying out different evaluation methods matched to respective ones of the light signals,
wherein a respective cumulative value is formed for each of the received light signals from n values of the received signals associated with respective ones of the light signals after each of the n values are multiplied by a factor, where n is greater than zero, and wherein each of the n values are associated with a respective start and a respective end of received members of the plurality of sequential individual pulses of the respective ones of the light signals and are each allocated different signs.

22. The optoelectronic sensor according to claim 21, wherein the optoelectronic sensor corresponds to a light barrier.

23. A method of operating an optoelectronic sensor, comprising:

a light transmitter transmitting light signals having a first time interval in a direction of a monitored zone, with at least some of the light signals each comprising a plurality of sequential individual pulses;

a light receiver receiving the light signals; and an evaluation unit processing received signals generated from the received light signals and outputting an object detection signal in dependence on results of the processing performed by the evaluation unit, wherein a plurality of the light signals are transmitted in a regular order, wherein characteristics of respective ones of the received signals are evaluated differently, wherein a first intermediate cumulative value is formed for one of the received light signals from a first set of n values of the received signal, associated with the start and with the end of the received individual pulses of the respective light signal, where n is greater than zero, wherein the first set of the n values are allocated signs that are the same among one another, wherein a second intermediate cumulative value is formed from a second set of n values of the one of the received light signals, wherein the second set of the n values have signs that are the same among one another, wherein the second set of the n values are associated with times which, on the one hand, are before reception of a first of the plurality of sequential individual pulses of the one of the received light signals and, on the other hand, have same time intervals among one another as the first set of the n values used for formation of the first intermediate cumulative value, and wherein a difference value is formed from the first and second intermediate cumulative values.

24. The method according to claim 23, wherein the first and second sets of n values of the one of the received light signals are each multiplied by a factor in each case before forming the respective first and second intermediate cumulative values, wherein the factors in each case are different from one another.

25. The method according to claim 24, wherein an object detection signal is output based on exceeding of a threshold value by the difference value.

26. The method according to claim 25, wherein an object detection signal is output when one of the respective cumulative values and the difference value each exceed threshold values associated with them.

27. An optoelectronic sensor system, comprising:

a light transmitter that transmits light signals having a first time interval in a direction of a monitored zone, with at least some of the light signals each comprising a plurality of sequential individual pulses;

a light receiver that receives the light signals; and an evaluation unit that processes received signals generated from the received light signals and that outputs an object detection signal in dependence on results of the processing performed by the evaluation unit, wherein a plurality of the light signals are transmitted in a regular order, wherein characteristics of respective ones of the received signals are evaluated differently, wherein a first intermediate cumulative value is formed for one of the received light signals from a first set of n values of the received signal, associated with the start and with the end of the received individual pulses of the respective light signal, where n is greater than zero, wherein the first set of the n values are allocated signs that are the same among one another, wherein a second intermediate cumulative value is formed from a second set of n values of the one of the received light signals, wherein the second set of the n values have signs that are the same among one another, wherein the second set of the n values are associated with times which, on the one hand, are before reception of a first of the plurality of sequential individual pulses of the one of the received light signals and, on the other hand, have same time intervals among one another as the first set of the n values used for formation of the first intermediate cumulative value, and wherein a difference value is formed from the first and second intermediate cumulative values.

* * * * *

UNITED STATES PATENT AND TRADEMARK OFFICE
CERTIFICATE OF CORRECTION

PATENT NO. : 7,638,753 B2  Page 1 of 1
APPLICATION NO. : 11/887870
DATED : December 29, 2009
INVENTOR(S) : Merettig It is certified that error appears in the above-identified patent and that said Letters Patent is hereby corrected as shown below:

| | |
|---|---|
| Title page, item 54, title | Delete "OF" and insert --FOR--. |
| Column 1, Line 1 | Delete "OF" and insert --FOR--. |
| Column 6, Line 12 | Insert --.-- after third occurrence of "$\mu s$". |
| Column 6, Line 14 | Insert --.-- after fourth occurrence of "$\mu s$". |
| Column 6, Line 31 | Delete "mounts" and insert --amounts--. |
| Column 9, Line 12 | Delete "signal" and insert --signals--. |
| Column 9, Line 50 | Delete "values" and insert --value--. |

Signed and Sealed this

Tenth Day of August, 2010

David J. Kappos
*Director of the United States Patent and Trademark Office*